US006641483B1

(12) United States Patent
Luciano et al.

(10) Patent No.: US 6,641,483 B1
(45) Date of Patent: Nov. 4, 2003

(54) LOCKABLE SECURITY CABINET FOR CASINO GAME CONTROLLERS

(75) Inventors: Robert A. Luciano, Reno, NV (US); Michael Souza, Reno, NV (US); Kurt W. Spencer, Reno, NV (US)

(73) Assignee: Sierra Design Group, Reno, NV (US)

( * ) Notice: Subject to any disclaimer, the term of this patent is extended or adjusted under 35 U.S.C. 154(b) by 0 days.

(21) Appl. No.: 09/642,550

(22) Filed: Aug. 17, 2000

Related U.S. Application Data

(60) Provisional application No. 60/149,522, filed on Aug. 17, 1999, provisional application No. 60/149,525, filed on Aug. 17, 1999, provisional application No. 60/153,895, filed on Sep. 14, 1999, and provisional application No. 60/191,898, filed on Mar. 23, 2000.

(51) Int. Cl.[7] ................................................ A63F 13/08

(52) U.S. Cl. ................. 463/46; 273/148 R; 273/148 B; 361/600

(58) Field of Search ........................... 361/752, 1, 600, 361/312, 70, 747, 72.6, 826; 312/7.2, 118, 120, 119, 123, 125, 136, 130, 117; 206/320, 315.1; 439/373; 70/94, 289; 463/29, 46; 348/836; D21/325, 369, 324, 326

(56) References Cited

U.S. PATENT DOCUMENTS 4,440,457 A * 4/1984 Fogelman et al. ........... 312/7.2
4,562,708 A * 1/1986 Gros ............................ 70/94
4,658,956 A * 4/1987 Takeda et al. .............. 206/320
4,782,676 A * 11/1988 Friedman ..................... 70/289
5,344,046 A * 9/1994 Maldanis et al. .............. 222/2
5,375,708 A * 12/1994 Wittman .................. 206/315.1
5,405,193 A * 4/1995 Herrenbruck ............... 312/118
6,012,941 A * 1/2000 Burdenko et al. .......... 439/373
6,201,703 B1 * 3/2001 Yamada et al. ............. 361/752

* cited by examiner

*Primary Examiner*—Jessica Harrison
*Assistant Examiner*—Yveste Cherubin
(74) *Attorney, Agent, or Firm*—Ryan A. Heck; Ian F. Burns & Associates

(57) ABSTRACT

A lockable security cabinet for game controllers of the type used to operate electronic slot and card games in gambling casinos. The cabinet includes multiple key locking doors and key operated control switches to allow access to specific areas and controls of a main cabinet thereof housing the computers and other electronics only by authorized persons having the proper key for reach particular area or control switch. The cabinet is slidably mounted to a locking base which bolts into a recess in a gaming table allowing the main cabinet to also be recessed therein yet slide out in a cantilevered fashion to access the doors and controls. The base includes a side or rear cable locking enclosure allowing access to and disconnecting of ends of cables connected to the game controller only upon unlocking of the base and outward sliding of the main cabinet.

25 Claims, 10 Drawing Sheets

FIG. 1
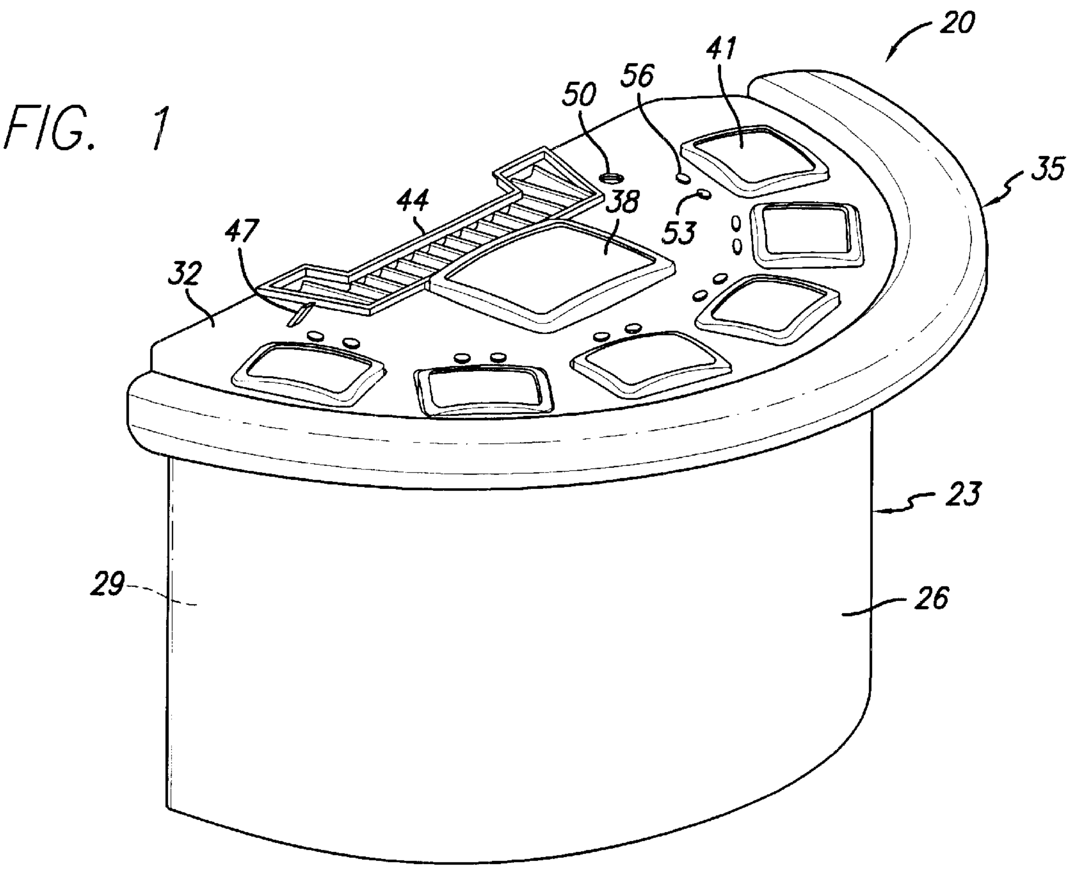
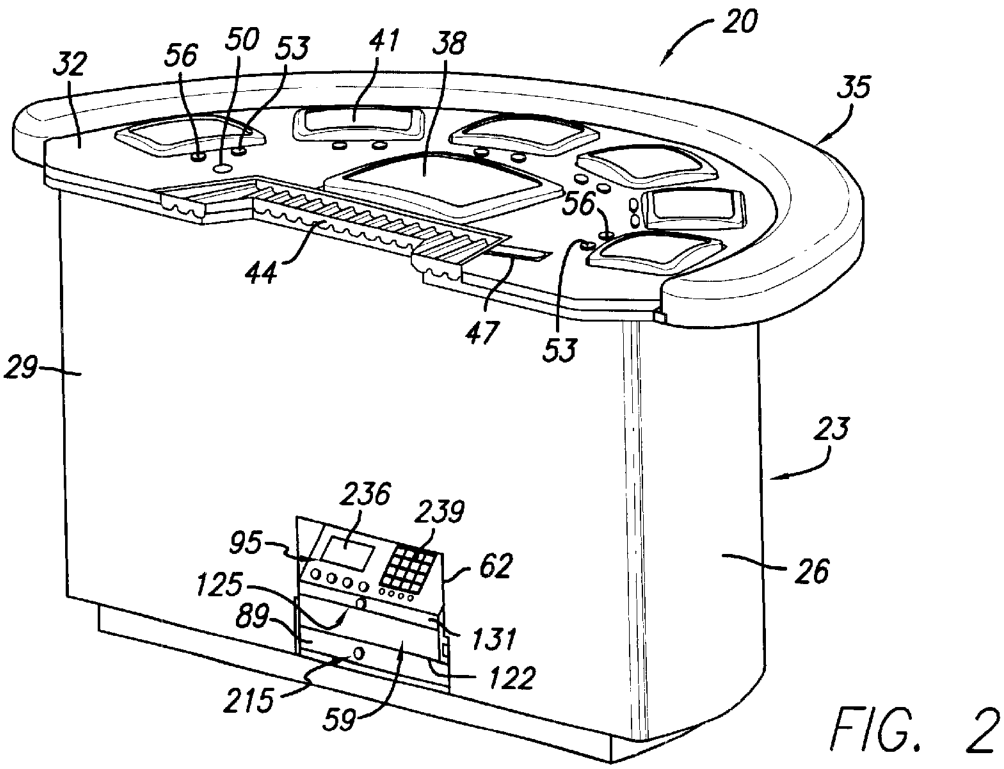
FIG. 2

LOCKABLE SECURITY CABINET FOR CASINO GAME CONTROLLERS

CROSS REFERENCES TO RELATED APPLICATIONS

This patent application claims priority of U.S. provisional patent application Ser. Nos. 60/149,522, filed on Aug. 17, 1999, 60/149,525, filed Aug. 17, 1999, 60/153,895, filed on Sep. 14, 1999, and Ser. No. 60/191,898, filed on Mar. 23, 2000.

BACKGROUND OF THE INVENTION

1. Field of Invention

The invention relates to game controllers for electronic gaming tables and devices, and more particularly to security enclosures and cabinets for such game controllers.

2. Description of Related Art

Modem casinos have a wide variety of gaming devices to entertain patrons and produce revenue. These gaming devices may include electromechanical slot machines and a variety of manually dealt card games such as poker, twenty-one, roulette, baccarat, and the like. In recent years, electronic versions of such games have replaced many of the manual versions. For example, many slot machines utilize electronic versions of spinning reels. These reels may be reproduced on a video display that is controlled by a video controller. Likewise, all of the major card games now appear in electronic form on similar video displays.

A controller generally operates electronic gaming devices. The controller can be built into the cabinet or housing of the gaming device or it can be connected to the gaming device from a remote location, such as a control room, by one or more cables. Game controllers can also be used to control a number of different gaming devices. For example, casino-type lottery systems generally utilize a number of separate gaming devices on the floor of a casino. The gaming devices request game outcomes from a central controller. The central game controller stores one or more pools of game outcomes that are transmitted to the gaming devices when appropriate.

One problem with electronic controllers is that various casino personnel need to access different portions and controls of the game controller at various times. However, because of the need for strict security in a gaming environment, it is often necessary to restrict access to sensitive components of the controller. For example, an operator might require only access to control certain game functions necessary to keep play going, while a management person might be the proper person to access more basic functions, such as resetting the game controller, and only maintenance personnel might be qualified to work on the electronics of the game controller. Likewise, the cable assemblies that connect the game controller to the gaming device being controlled tend to be loosened, removed, or stolen from time-to-time. Therefore, it is also desirable to restrict access to the cable assemblies to specifically authorized persons.

SUMMARY OF INVENTION

1. Advantages of the Invention

The lockable security cabinet for game controllers provides multiple levels of security wherein only authorized persons can access specific controls, electronics, and cable connections of the game controller. The security cabinet further provides convenient access to the game controller electronics and cable assemblies by means of the slide-out design of the main cabinet with the base recessed in the gaming table or other enclosure, a plurality of access doors, and the slide opening design of the cable enclosure.

These and other advantages of the present invention may be realized by reference to the remaining portions of the specification, claims, and abstract.

2. Brief Description of the Invention

The invention is a lockable security cabinet for game controllers such as used in gambling casinos to operate and control one or more gaming terminals. The security cabinet houses the electronics of the game controller, and the cable connectors at one end of respective cable assemblies connected thereto for communications with external devices. The security cabinet comprises a main cabinet having a plurality of interconnected walls defining an enclosable inner compartment for housing the electronic components of the game controller, and one or more lockable access devices, typically comprising one or more key switches which control access to specific game controller functions, and/or one or more lockable access members such as key lockable doors pivotally connected to the main cabinet. Each access member is movable upon unlocking thereof to provide access to at least a portion of the electronic components of the game controller within the main cabinet, preferably an access member disposed at the top of the main cabinet for access to the processor boards and the power supply, and an access member disposed at the front of the main cabinet for access to the user accessible components (i.e: those components of the game controller which must be accessed on a regular basis) such as keyboard and monitor ports which allow a keyboard and a monitor to be connected to the game controller to program, operate, and maintain the game controller. Other such user accessible components include ports for memory devices such as ROM cards, flash memory cards, and communications devices.

An access member can also be movably connected to the main cabinet to control access to the connection and disconnection of cable assemblies. This access member for the cables preferably comprises a portion of a base on which the main cabinet is movably mounted such as for sliding in a front-to-rear direction. The portion of the base, such as comprising an enclosure structure, preferably is at a rear portion of the base for connection of the cable assemblies at the rear of the main cabinet or at a side portion of the base for connection of the cables assemblies at the side of the main cabinet, in both cases with the cables exiting rearwardly therefrom, so as to substantially enclose and retain the connector of the cable assemblies connected to the game controller. The cable of the cable assembly attached thereto extends through an elongate gap while the main cabinet is in a retracted, or closed position on the base. The main cabinet is lockable in such a closed position by means of a key lock. A rear cable guide bracket can be affixed to the rear of the main cabinet for guiding cable assemblies during forward and backward movement of the main cabinet on the base. Other types of cables which can be locked include Ethernet, parallel, various communication, VGA (video), coax, audio, etc. Typically, to provide the various levels of security, each key lock requires a different key to unlock.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 1 is substantially a front perspective view of a typical electronic gaming table of the type wherein a game controller can be housed in a security cabinet of the invention;

FIG. 2 is substantially a rear perspective view of such electronic gaming table showing a first embodiment security cabinet of the invention having a rear cable enclosure structure, as mounted in a recess therein;

DESCRIPTION OF THE PREFERRED EMBODIMENT

Figure 3:
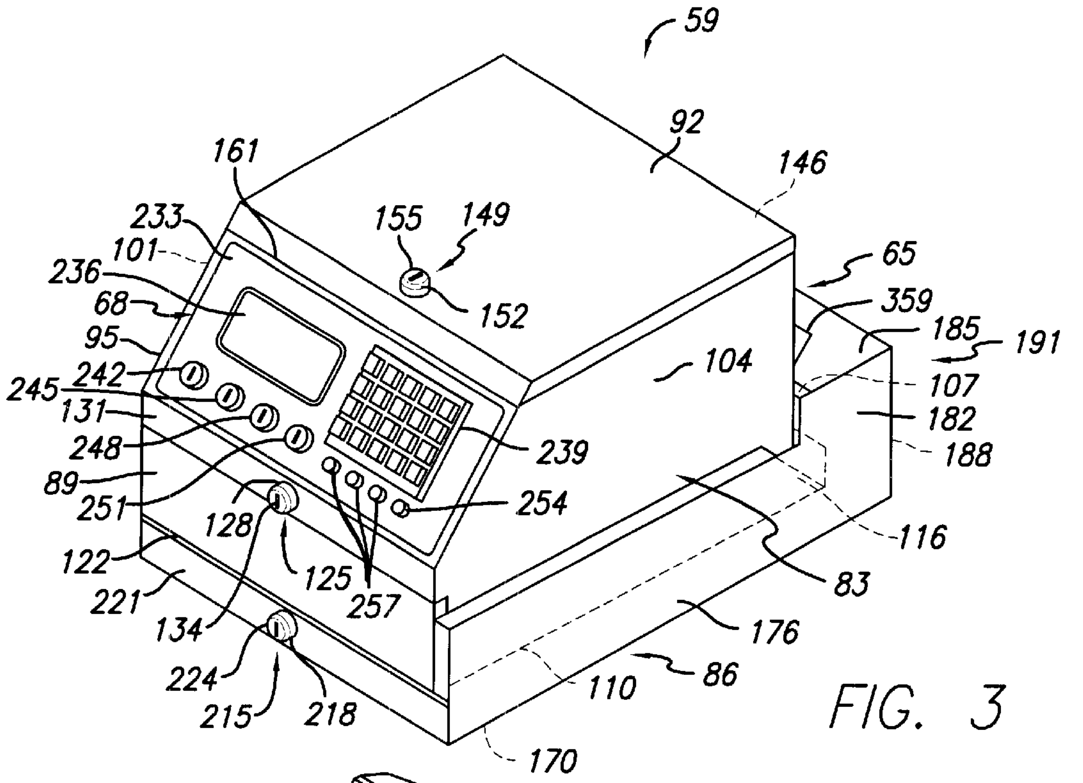
FIG. 3 is substantially a front perspective view of such first embodiment security cabinet.

Referring to FIGS. 1 and 2, therein is shown a typical electronic gaming table used in modern casinos of the type that can use the locking controller box of the present invention. Electronic gaming table 20 is used, for example, to play an electronic version of the card game twenty-one. Gaming table 20 comprises an upstanding, semi-cylindrical frame 23 having an arcuate wall 26 around which the players (not shown) stand or sit, a flat wall 29 adjacent which the dealer (not shown) stands, and a semi-circular table top 32 having an arcuate padded rail or rim 35 along the perimeter thereof. Extending through table top 32 is a dealer's video display 38, typically being a cathode ray tube (CRT), which is centrally located on table top 32, and a plurality of player's video displays 41, also typically being of the CRT type, in an arcuate line adjacent padded rim 35 of table top 32. A plurality of virtual cards (not shown) are presented on the dealer's video display 38 and on the player's video displays 41, the virtual cards being electronic versions of regular playing cards, dealt from a virtual card deck (not shown) such as generated by a random number generator (not shown). The dealer's video display 35 and the player's video displays 41 can be covered with a polarized light filter or other such privacy filter or mechanical shield (not shown) which limits the visual range in which the dealer's and player's video displays 38 and 41 can be viewed by adjacent players, the dealer, and other such persons.

The gaming table 20 further comprises a centrally located chip tray 44 for holding the dealer's chips (not shown), a bill slot 47 for the dealer to place paper money into given by the players in exchange for chips, and a chip slot 50 for placing chips. The central chip tray 44 allows easy use of the chips so there is minimal disruption of the game as it is played, and the various bets are collected or paid. Other versions of gaming table 20 can accept cash, credit and debit cards, or VIP cards with a given cash value used in place of chips for betting. The dealer's video display 38 and the player's video displays 41 can be of the touch screen type. Adjacent each player's video display 38 is a first spot 53 associated with a respective proximity sensor (not shown) such as of the capacitive, radio frequency, optical, or pressure sensitive type mounted beneath table top 32 to sense when chips have been bet and the position active so as to deal virtual cards on the respective player's displays 38. The gaming table 20 can therefore know whether a given player's station will participate in the next gaming round. Also adjacent each player's video display 38 is a second spot 56 also associated with a respective proximity sensor (not shown) of a similar type to sense when one or more chips have been bet such as for side bets. A first version game controller 59 incorporating a first embodiment security cabinet of the invention is mounted in a recess 62 through flat wall 29 of frame 23. Game controller 59 houses the electronic components (not shown) which make the game work.

It is to be under stood that game table 20 is only one application for the game controller 59. Many other uses are possible. For example, game controller 59 may be linked to a plurality of different gaming devices (not shown) by cables. In this application, game controller 59 may be placed on a table or stand.

Referring to FIG. 3, therein is shown a first version game controller 59 which comprises a first embodiment security cabinet 65, a control panel 68, a main circuit board 71, a central game server (CGS) computer module 74, a central accounting server (CAS) computer module 77, and a power supply 80. Security cabinet 65 comprises a main cabinet 83, a base 86, a ROM door or front access door 89, and a processor board door or top access door 92. Main cabinet 83 includes a sloped front wall 95 having a rectangular opening 98, a pair of side walls 101 and 104, a rear wall 107, a bottom wall 110 interconnecting side walls 101 and 104, a transverse mounting wall 113, a rearwardly extending portion 116, and a power supply support 119.

Front access door 89 is pivotally mounted to bottom wall 110 by means of a first piano hinge 122 and which is retainable in a closed position by means of a first rotary key lock 125 having a body 128 mounted to a vertical face 131 of front wall 95, and having a rotatable cylinder 134 into which a key (not shown) is inserted. A locking tab 137 rotates with cylinder 134 into a corresponding slot 140 of an upper cross member 143 of front access door 89 to lock front access door 89. Top access door 92 is pivotally mounted to rear wall 107 by means of a second piano hinge 146, and is retainable in a closed position by means of a second rotary key lock 149 having a body 152 mounted to top access door 92. A rotatable cylinder 155 includes an attached locking tab 158 which rotates to a position under an edge portion 161 of front wall 95 to lock top access door 92. A retaining strap (not shown) retains top access door 92 in the open position during access therein.

Base 86 comprises a lower wall 170 which interconnects a pair of side walls 173 and 176 having respective upwardly extending rear portions 179 and 182 which are interconnected by a partial top wall 185 and a rear wall 188 so as to comprise a cable enclosure structure 191. Main cabinet 83 is slidably mounted to base 86 by means of a pair of slides such as ball bearing drawer slides 194 and 197 having respective upper slide members 200 and 203 and lower slide members 206 and 209, upper slide members 200 and 203 being affixed to the exterior of respective side walls 101 and 104 of main cabinet 83, and lower slide members 206 and 209 being affixed to the interiors of respective side walls 145 and 148 of base 86. Main cabinet 83 can be retained in a closed position, wherein main cabinet 83 is enclosed except for a cable gap "G" (FIG. 8) between a front edge 212 of partial top wall 185 and rear wall 188 of base 86, by means of a third rotary key lock 215 having a body 218 mounted to an upstanding front lip 221 of lower wall 170 and having a rotatable cylinder 224 with attached locking tab 227 which rotates into a transverse slot 230 through bottom wall 110 of main cabinet 83.

Figure 4:
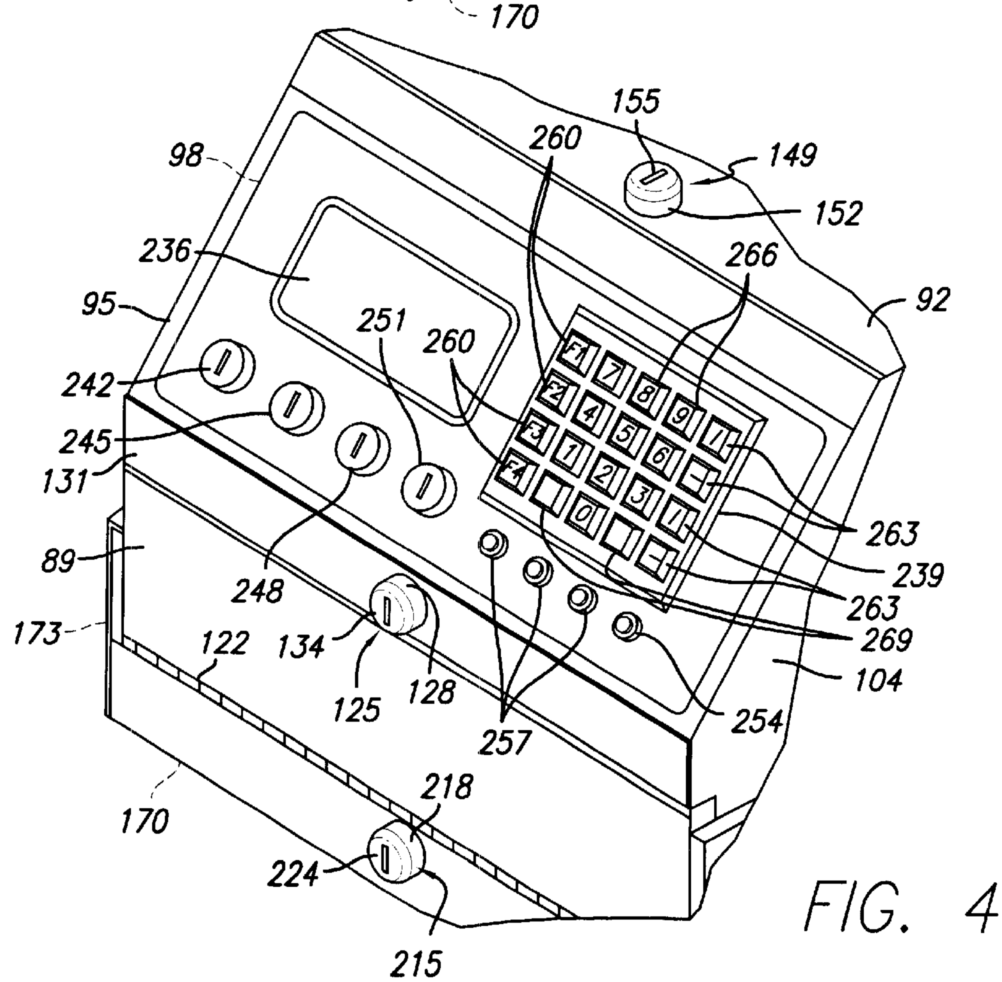
FIG. 4 is substantially a fragmentary front perspective view showing the details of the control panel.
Figure 5:
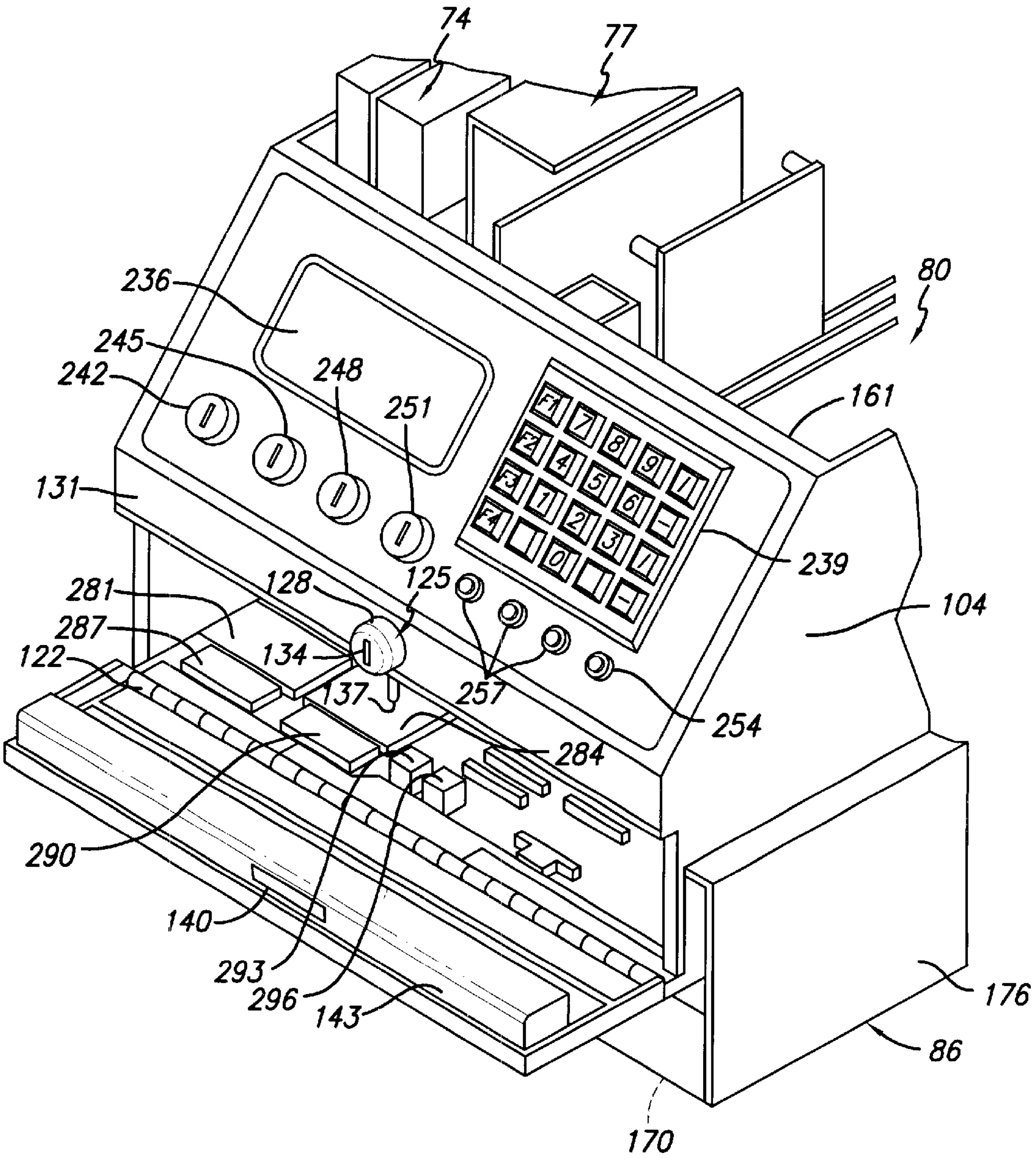
FIG. 5 is substantially a fragmentary front perspective view corresponding to FIG. 4, wherein the front access door is shown in the unlocked and open position allowing access to the user accessible components.
Figure 6:
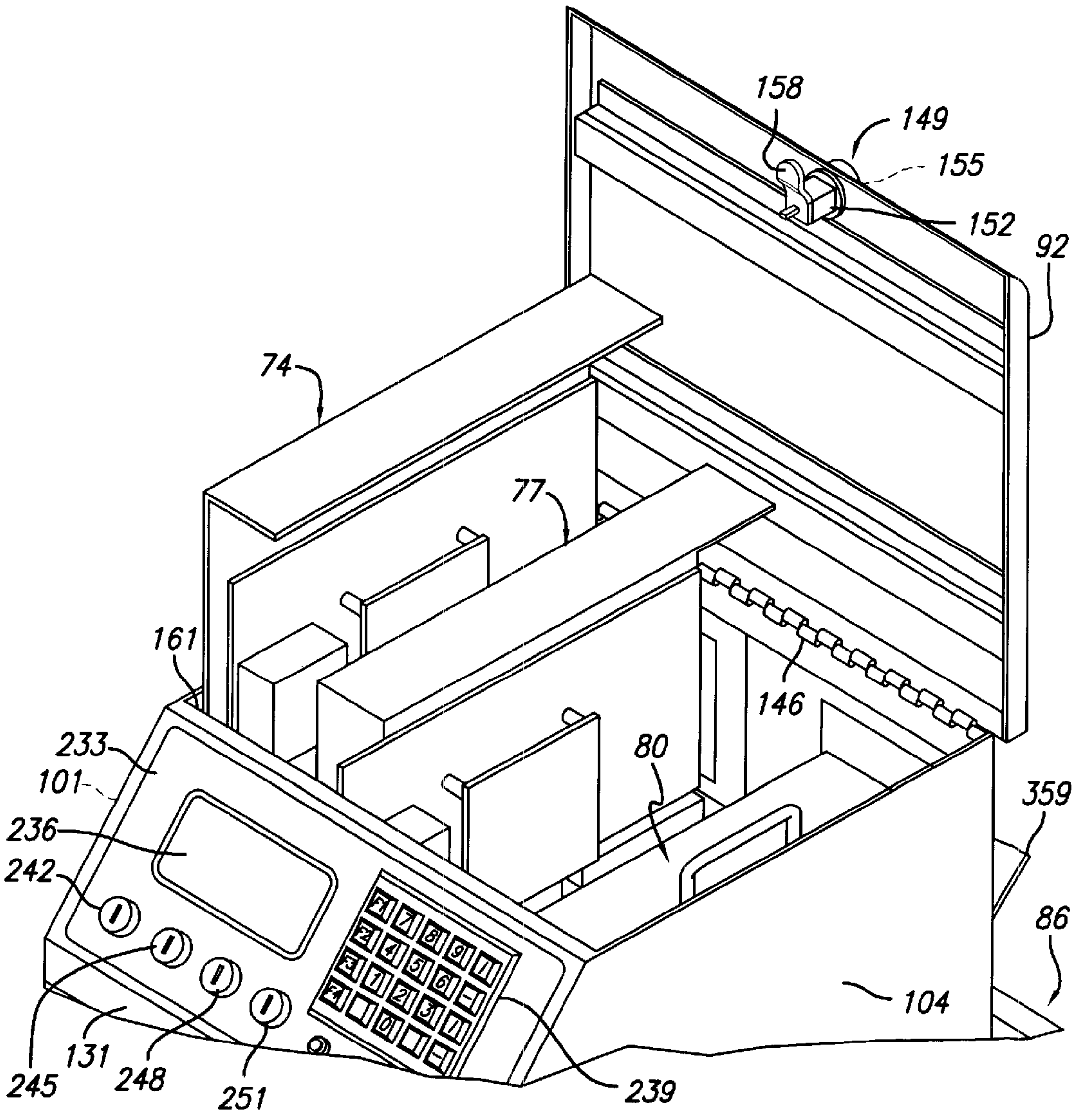
FIG. 6 is substantially a fragmentary side perspective view wherein the top access door is shown in the unlocked and open position allowing access to the processor boards and the power supply.
Figure 7:
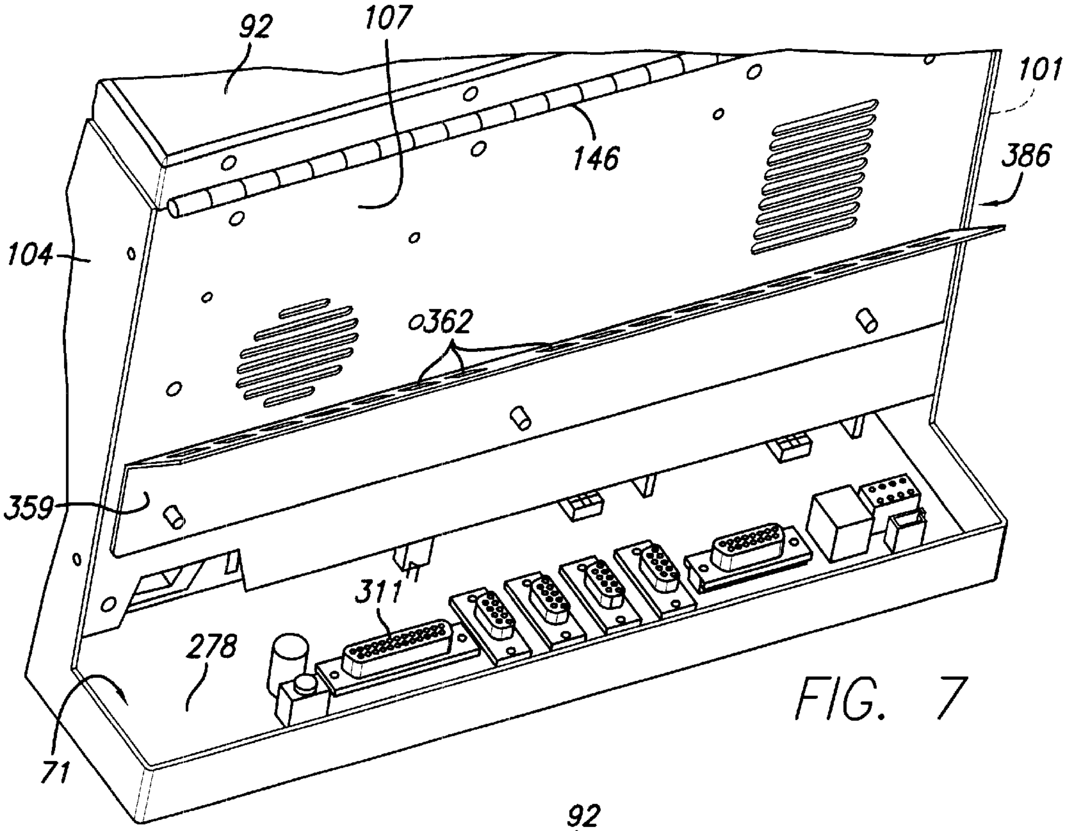
FIG. 7 is substantially a rear perspective view of the main cabinet and the main circuit board, without the attached base.

Referring to FIG. 4, control panel 68 provides administration and configuration access as well as displays system status. Control panel 68 comprises a plate 233, a vacuum fluorescent display (VFD) 236, a keypad 239, a plurality of rotary key switches 242, 245, 248, and 251, a power indicator light emitting diode (LED) 254, and a plurality of status indicator LED's 257. VFD display 236 is a four line by twenty character long display capable of displaying information such as the system operation and status, software revision information, configuration data, or any other message programmed into the software. Keypad 239 includes a plurality of function keys 260, arrow keys 263, digit keys 266, and delete keys 269. Keypad 239 is the primary input device for administration level data. Each rotary key switch 242, 245, 248, and 251 are individually keyed (require a separate key to activate/deactivate the switch) and provide a means to switch to high security modes for administration and debugging. The power indicator LED 254 indicates whether the system has power, and the status indicator LED's 257 indicate communications and other status of the system. A control panel wire harness (not shown) extends rearwardly from control panel 68 interconnecting the various components thereof to the other electronics.

Main circuit board 71 includes a front portion 272, a middle portion 275, and a rear portion 278. Front portion 272 includes compact flash ROM connectors 281 and 284 into which are plugged a pair of respective compact flash ROM cards 287 and 290 (one for each processor) which provide a means for information storage and custom game templates, and keyboard connectors 293 and 296 (one for each processor) which allow super user input to the processors. The rear portion 278 of main circuit board 71 is where all of the external connections are made to game controller 59 and main circuit board 71. These include, for example, CAS printer parallel port connector 311, which is a standard printer parallel port capable of operating most printers Main circuit board 71 slides into main cabinet 83 and is secured therein such as by screws (not shown). In such mounted condition, front portion 272 of main circuit board 71 is adjacent front access door 89 and rear portion 278 thereof extends onto rearwardly extending portion 116 of main cabinet 83. Therefore, just behind front access door 89 lies access to the wire harness (not shown) of front control panel 68, as well as to the user accessible components such as the compact flash ROM cards 287 and 290, and keyboard connectors 293 and 296. At rearwardly extending portion 116, connectors including CSA parallel printer port connector 265 are accessible when main cabinet 83 is in the open position.

Figure 8:
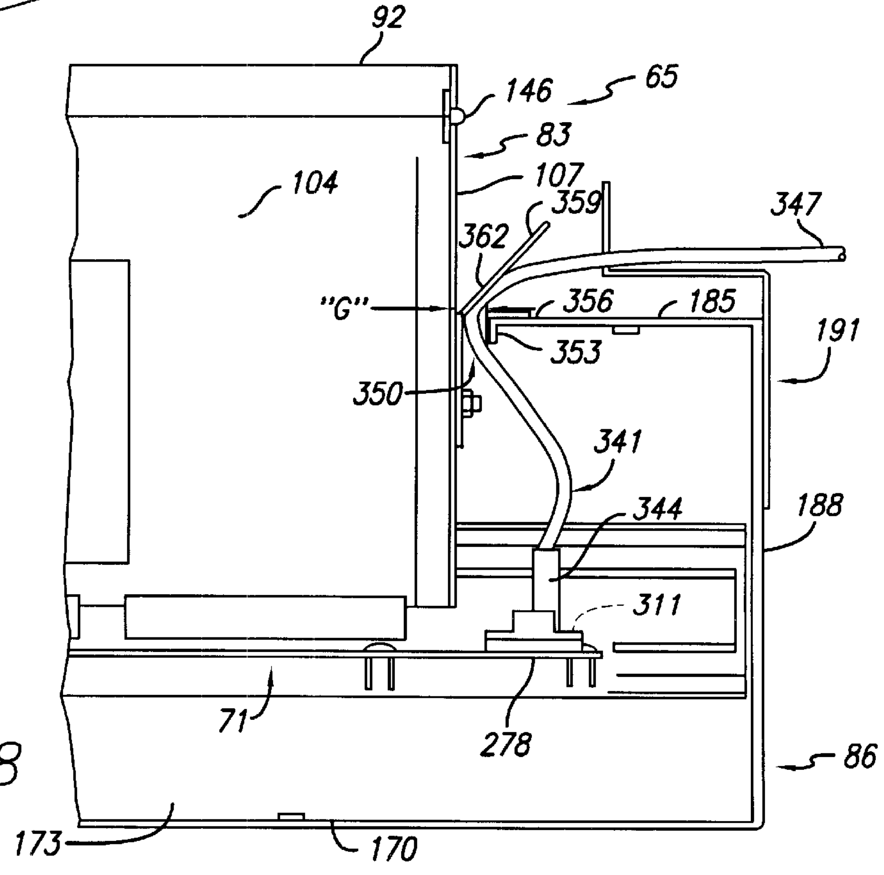
FIG. 8 is substantially a fragmentary longitudinal vertical sectional view showing the details of the rear cable enclosure structure.

Referring to FIG. 8, rear wall 107 and rearwardly extending portion 116 of main cabinet 83 work in conjunction with enclosure structure 191 to prevent the removal or theft of cables such as a parallel cable assembly 341, which includes a parallel port connector 344 and a connected sleeved wire cable 347. After unlocking base 86, sliding main cabinet 83 forward, and connecting cable assembly 341 such as to CAS printer parallel port connector 311, main cabinet 83 is moved to the closed position shown and locked. Cable 347 extends through a transverse opening 350 formed between rear wall 107 of main cabinet 83 and a downwardly directed lip 353 of end portion 356 of partial top wall 185 of base 86. With main cabinet 83 in such closed position, opening 350 is slightly larger than the diameter of cable 347 so as not to be pinched, but small enough so as to not pass connector 344, effectively retaining cable assembly 341 to main cabinet 65 until base 86 is unlocked and main cabinet 83 moved forward to open.

An angled bracket 359 having a plurality of generally vertically disposed, parallel slots 362 can be affixed to rear wall 107 of main cabinet 83, with cable 347 bending into a respective slot 362 to laterally retain cable 347 as main cabinet 83 moves forward and backward during use.

Figure 9:
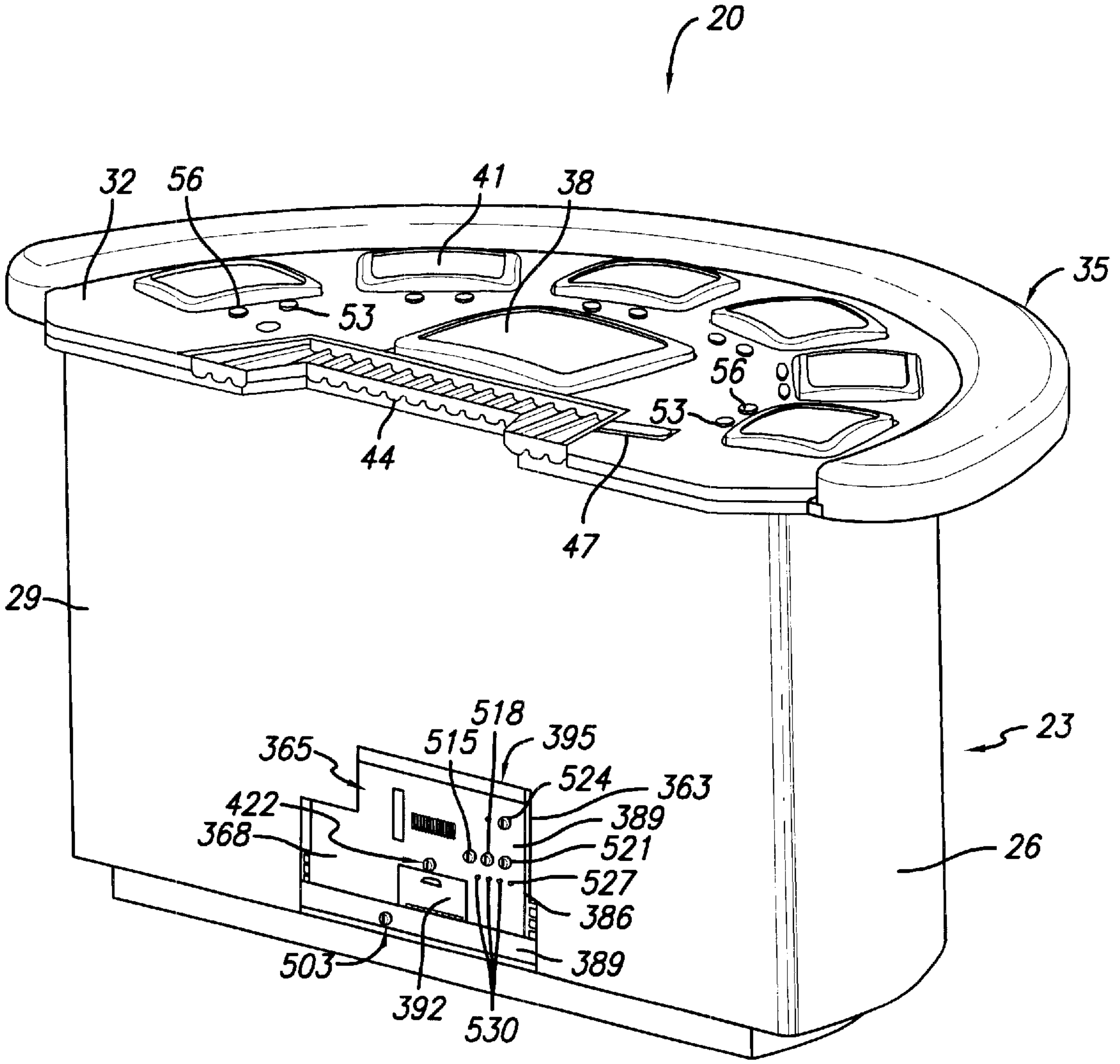
FIG. 9 is substantially a rear perspective view of an electronic gaming table similar to that of FIGS. 1 and 2, but modified to use a second embodiment security cabinet of the invention having a side cable enclosure structure.
Figure 10:
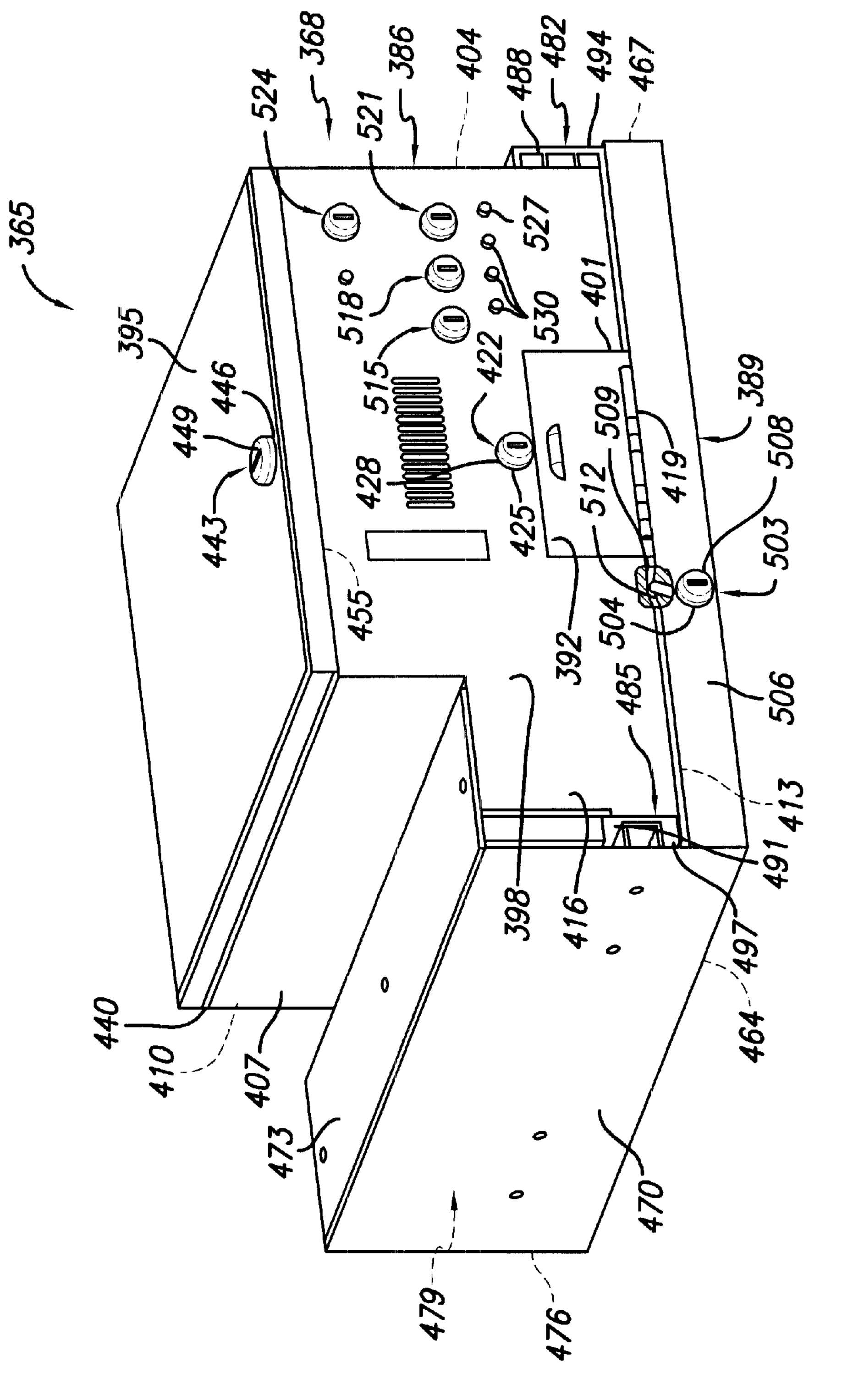
FIG. 10 is substantially a front perspective view of such second embodiment security cabinet.

Referring to FIG. 9, therein is shown gaming table 20, but using a second version game controller of similar design to first version game controller 59, but having side cable access and locking rather than rear, being disposed in a recess 363 of slightly modified design from recess 62. As shown in FIGS. 10–13, the second version game controller 365 comprises a second embodiment security cabinet 386, a control panel 371, a main circuit board 374, a central game server (CGS) computer module 377, a central accounting server (CAS) computer module 380, and a power supply 383. Security cabinet 368 comprises a main cabinet 386, a base 389, a front access door 392, and a top access door 395. Main cabinet 386 comprises a front wall 398 having a rectangular opening 401, a pair of side walls 404 and 407, a rear wall 410, a bottom wall 413 interconnecting side walls 404 and 407, and a laterally extending portion 416. Front access door 392 is pivotally mounted to bottom wall 413 by means of a first piano hinge 419 and which is retainable in a closed position by means of a first rotary key lock 422 having a body 425 mounted to front wall 398, and a rotatable cylinder 428 into which a key (not shown) is inserted, with an attached locking tab 431 which rotates into a corresponding slot 434 of an upper cross member 437 of front access door 392.

Top access door 395 is pivotally mounted to rear wall 410 by means of a second piano hinge 440 and which is retainable in a closed position by means of a second rotary key lock 443 having a body 446 mounted to top access door 395, and having a rotatable cylinder 449 with attached locking tab 452 which rotates to a position under an edge portion 455 of front wall 398. A gas spring 458 connected to respective pins 461 retains top access door 395 in the open position.

Base 389 comprises a lower wall 464 which interconnects a pair of side walls 467 and 470, which are interconnected by a partial top wall 473, and a rear wall 476 so as to comprise a cable enclosure structure 479 which, in conjunction with rear wall 410 of main cabinet 386 prevents the unauthorized removal or the theft of cables. Main cabinet 386 is slidably mounted to base 389 by means of a pair of slides such as ball bearing drawer slides 482 and 485 having respective upper slide members 488 and 491 and lower slide members 494 and 497, upper slide members 488 and 491 being affixed to the exterior of respective side walls 404 and 407 of main cabinet 386, and lower slide members 494 and 497 being affixed to the interiors of respective side walls 467 and 470 of base 386. Main cabinet 386 can be retained in a closed position, by means of a third rotary key lock 503 having a body 504 mounted to an upstanding front lip 506 of lower wall 464 and having a rotatable cylinder 508 with attached locking tab 509 which rotates into a transverse slot 512 through lower wall 413 of main cabinet 386.

Figure 11:
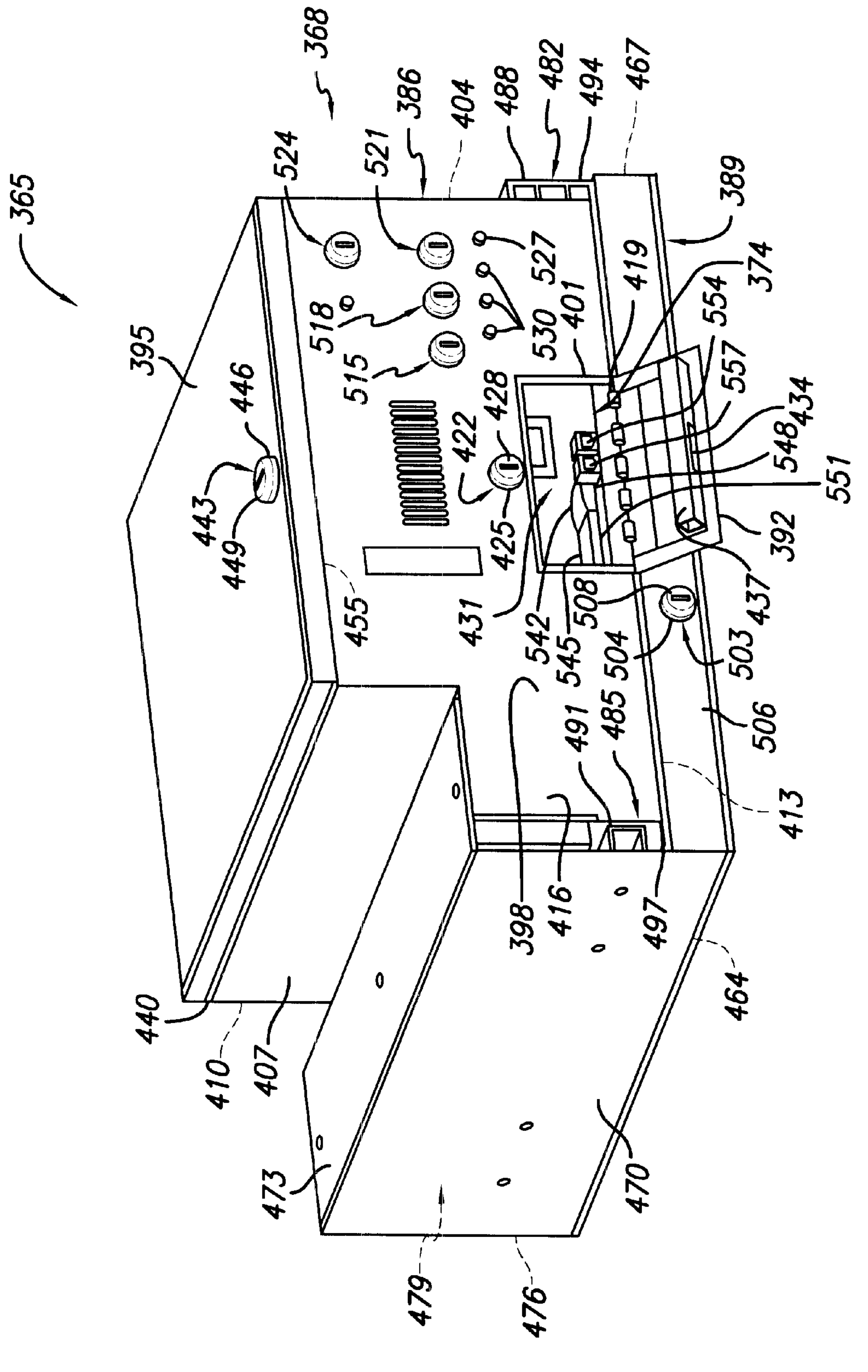
FIG. 11 is substantially a front perspective view corresponding to FIG. 10, but wherein the front access door is in the open position.
Figure 12:
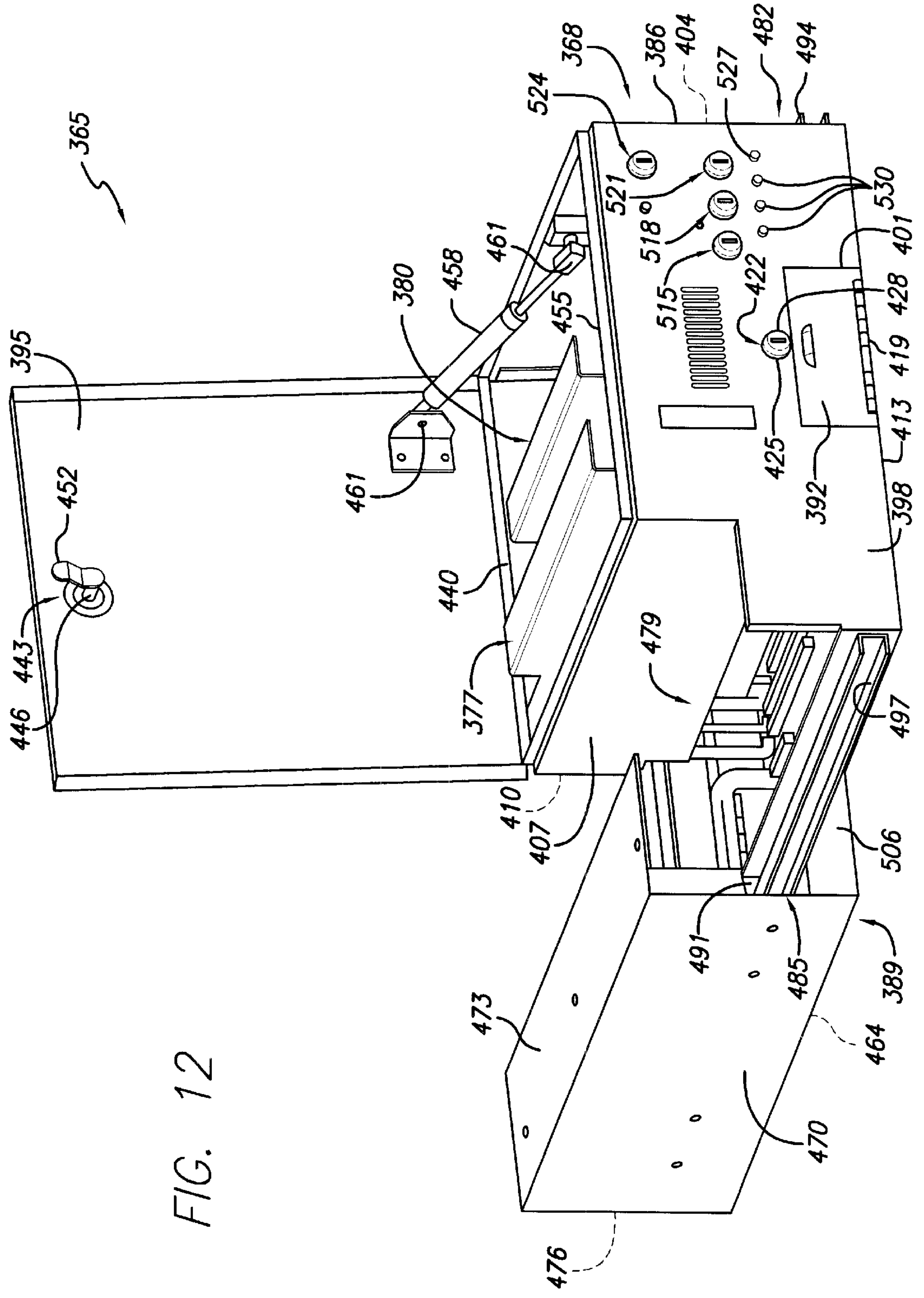
FIG. 12 is substantially a front perspective view corresponding to FIGS. 10 and 11 wherein the top access door is in the open position and the main cabinet is in the forward or extended position.
Figure 13:
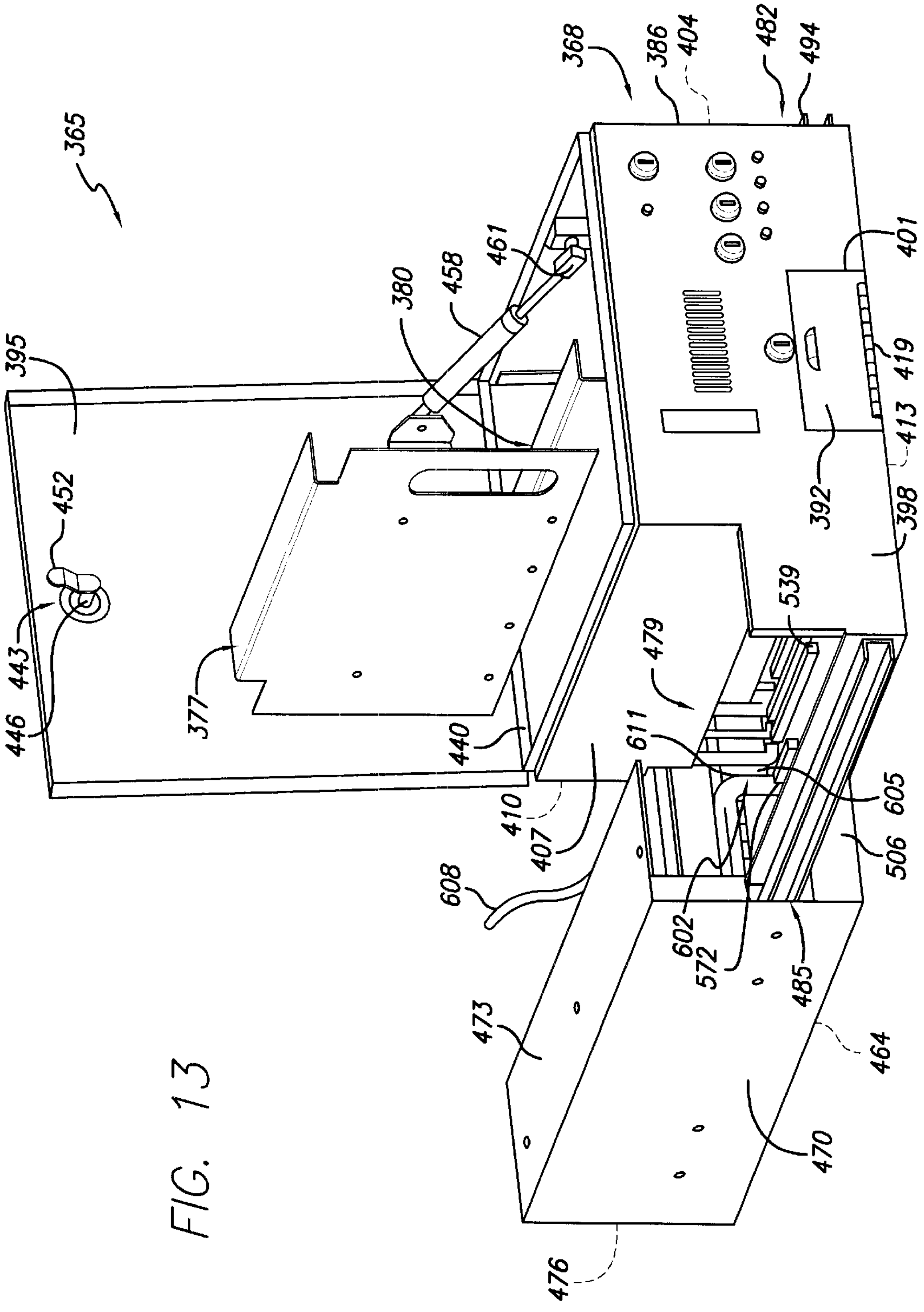
FIG. 13 is substantially a front perspective view corresponding to FIG. 12, wherein a processor board is partially removed.

Referring to FIG. 11, front wall 398 provides administration and configuration access as well as displays system status through a plurality of rotary key switches 515, 518, 521, and 524, a power indicator light emitting diode (LED) 527, and a plurality of status indicator LED's 530. Each rotary key switch 515, 518, 521, and 524 are individually keyed and provide a means to switch to high security modes for administration and debugging. The power indicator LED 527 indicates whether the system has power, and the status indicator LED's 530 indicate communications and other status of the system. A control panel wire harness (not shown) extends rearwardly from front control panel 62 interconnecting the various components thereof to the other electronics.

Main circuit board 374 includes a front portion 533, a middle portion 536, and a rear portion 539. Front portion 533 includes compact flash ROM connectors 542 and 545 into which are plugged a pair of respective compact flash ROM cards 548 and 551 (one for each processor) which provide a means for information storage and custom game templates, keyboard connectors 554 and 557 (one for each processor) allow super user input to the processors. Main circuit board 374 slides into main cabinet 386 and is secured therein. In such mounted condition, front portion 533 of main circuit board 374 is adjacent front access door 392 and side portion 539 thereof extends onto laterally extending portion 416 of main cabinet 386. Therefore, just behind front access door 392 lies access to the wire harnesses (not shown), and the user accessible components such as compact flash ROM cards 548 and 551, and keyboard connectors 554 and 557. At laterally extending portion 416 of main cabinet 386 are connectors such as CAS printer port connector 572 which are accessible when main cabinet 386 is in the open position.

Referring to FIGS. 10–13, laterally extending portion 416 of main cabinet 386 acts as a lock to prevent the removal or theft of cables such as a parallel cable assembly 602, which includes a parallel port connector 605 connected to a sleeved wire cable 608. After unlocking base 389 and connecting parallel cable assembly 602 such as to CAS printer parallel port connector 572, main cabinet 386 is moved to the closed position shown and locked. Cable 608 extends through a vertical opening 611 formed between rear wall 476 of base 389 and rear wall 410 of main cabinet 386. With main cabinet 386 in such a closed position, vertical opening 611 is of a gap "GI" which is slightly larger than the diameter of cable 608 so as not to be pinched, but small enough so as to not pass connector 605, effectively retaining cable assembly 602 to game controller 365 until base 389 is unlocked and main cabinet 386 is moved forward to open.

An angled bracket (not shown) having a plurality of generally vertically disposed, parallel slots of similar design to bracket 359 can be affixed to rear wall 410 of main cabinet 386, with cable 608 bending into a respective slot thereof to laterally retain cable 608 as main cabinet 386 is moved forward and rearward on base 389 during use.

Many variations of the of the lockable security cabinet can be made while staying within the same inventive concept. For example, the access members can be plates which are removably, lockably connectable to the main cabinet rather than being doors pivotally connected thereto. The access members can be located anywhere desired to access the desired components therein. Other locks can be used than the cylinder type rotary key locks, with electronic locks which use a code rather than a physical code can likewise be used.

CONCLUSION

The lockable security cabinet for casino game controllers provides access security never before available in prior art enclosures for game controllers by permitting only authorized persons to access specific controls, electronics, and cable connectors inside the game controller. This high security is provided in an easily accessible package with convenient access to the game controller electronics and cable assemblies by means of the slide-out design of the main cabinet with the base recessed in the gaming table or other enclosure, the plurality of access doors, and the slide opening design of the cable enclosure.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A lockable security cabinet for game controllers such as used in gambling casinos to operate and control one or more gaming terminals comprising:

(A) a main cabinet having a plurality of interconnected walls defining an enclosable inner compartment for housing electronic components;

(B) a lockable access member connected to the main cabinet, the access member being movable upon unlocking thereof to provide access to at least a portion of the electronic components within the main cabinet;

(C) a lockable access member key, the lockable access member key configured to lock and unlock the lockable access member;

(D) a base, wherein the main cabinet is slidably connected to the base for frontward and rearward movement thereof, and wherein at least the electronic components positioned within the main cabinet are configured to slide with the main cabinet for convenient access thereof; and (E) a control panel having at least one rotary key switch, wherein the at least one rotary key switch is activated by a key that is unique to the rotary key switch, and which is different than the lockable access key.

2. A lockable security cabinet according to claim 1, further comprising an access door disposed on a top portion of the main cabinet.

3. A lockable security cabinet according to claim 2, wherein the access door provides access to at least one computer for removal and maintenance thereof.

4. A lockable security cabinet according to claim 3, wherein the access door is pivotally connected to the main cabinet, the door being lockable in a closed position prohibiting access by means of a first and second key lock attached to a free end of the door, the key locks being operatively engagable with the main cabinet.

5. A lockable security cabinet according to claim 4, wherein the key locks each require a different key to unlock.

6. A lockable security cabinet according to claim 1, wherein the main cabinet is lockable to the base in a closed position by means of a key lock.

7. A lockable security cabinet according to claim 1, wherein connection for the cable assemblies is at the rear portion of the main cabinet.

8. A lockable security cabinet according to claim 7, further comprising a cable guide which is affixed to the rear portion of the main cabinet for guiding cable assemblies during movement of the main cabinet on the base.

9. A lockable security cabinet according to claim 7, wherein the rear portion of the main cabinet and a rear portion of the base substantially enclose and retain the connectors of the cable assemblies connected to the electronics.

10. A lockable security cabinet according to claim 1, wherein the connection for the cable assemblies is at one side of the main cabinet.

11. A lockable security cabinet according to claim 10, wherein a side portion of the base and a side portion of the main cabinet substantially enclose and retain the connectors of the cable assemblies connected to the electronics.

12. A lockable security cabinet for game controllers such as used in gambling casinos to operate and control one or more gaming terminals, comprising:

(A) a main cabinet comprising a plurality of interconnected walls defining an enclosable inner compartment for housing at least one electronic component, a portion of the main cabinet having a cable connector;

(B) a base to which the main cabinet is slidably connected, the main cabinet being slidable between a first and a second position;

(C) an enclosure structure defined by the base, the enclosure structure and at least one of the plurality of walls of the main cabinet defining a cable gap, the cable gap being a size capable of preventing a cable connector from passing through the gap when the main cabinet is in the first position, wherein the main cabinet and the base substantially enclose and retain the cable assembly when the main cabinet is in the first position and the cable assembly may be removed from the enclosure structure when the main cabinet is in the second position; and (D) a cable connected to the cable connector, the cable passing from the interior of the main cabinet and base and through the cable gap, wherein the cable is adapted to be connected to a device external to the security cabinet.

13. A lockable security cabinet according to claim 12, wherein the cable connector is at a side portion of the main cabinet.

14. A lockable security cabinet according to claim 12, wherein the cable connector is at a rear portion of the main cabinet.

15. A lockable security cabinet according to claim 12, further comprising a cable guide attached to the main cabinet for guiding cable assemblies during movement of the main cabinet on the base.

16. A lockable security cabinet according to claim 12, further comprising at least one door attached to the main cabinet, wherein the door selectively provides and prohibits access to an electronic components inside the main cabinet.

17. A lockable security cabinet according to claim 15, wherein the door is lockable in a closed position prohibiting access by means of a key lock attached to a free end of the door, the key lock being operatively engageable with the main cabinet.

18. A lockable security cabinet according to claim 15, wherein the door is lockable in a closed position prohibiting access by means of a first and second key lock attached to a free end of the door, the first and'second key locks being operatively engageable with the main cabinet, wherein the key locks each require a different key to unlock.

19. A lockable security cabinet according to claim 12, wherein the main cabinet is lockable to the base in a closed position by means of a key lock.

20. A lockable security cabinet for game controllers such as used in gambling casinos to operate and control one or more gaining terminals, the game controller having a plurality of electronic components including at least one computer which controls the gaming terminals, at least one user accessible component requiring periodic access by a user, and one or more cable connectors to which respective cable assemblies are connectable such as for communications with external devices, the lockable security cabinet comprising:

(A) a main cabinet having a plurality of interconnected walls defining an enclosable inner compartment for housing the electronic components; wherein the main cabinet is linearly slideably connected to a base for frontward and rearward movement thereof, said base being mountable with said main cabinet substantially completely within a recess of a structure in a recessed position, and wherein said main cabinet is slidable to a cantilevered position generally extending from the recess for easy access thereto; and (B) a lockable access device selected from the group consisting of an access member and a key switch, wherein the lockable access device is connected to the main cabinet, said access member being movable upon unlocking thereof to provide access to at least a portion of the electronic components within said main cabinet, and which is movably connected to the main cabinet and which selectively provides and prohibits access for connection and disconnection of at least one cable to the electronic components, said access device comprising the base to which the main cabinet is movably connected; and said key switch being operatively connected to the electronics for control thereof.

21. A lockable security cabinet according to claim 20, wherein the connection for the cable assemblies is at the rear portion of the main cabinet.

22. A lockable security cabinet according to claim 21, further comprising a cable guide which is affixed to the rear portion of the main cabinet for guiding cable assemblies during movement of said main cabinet on the base.

23. A lockable security cabinet according to claim 21, wherein the rear portion of the main cabinet and a rear portion of the base substantially enclose and retain the connectors of the cable assemblies connected to the electronics.

24. A lockable security cabinet according to claim 20, wherein the connection for the cable assemblies is at one side of the main cabinet.

25. A lockable security cabinet according to claim 24, wherein a side portion of the base and a side portion of the main cabinet substantially enclose and retain the connectors of the cable assemblies connected to the electronics.

* * * * *